July 9, 1968     W. J. CAGLE ET AL     3,391,663

HITCH STRUCTURE

Filed April 22, 1965     2 Sheets-Sheet 1

INVENTORS:
WESLEY J. CAGLE
IRVIN R. CUTHBERTSON
BY: Arthur J. Hansmann
ATTORNEY

July 9, 1968   W. J. CAGLE ET AL   3,391,663
HITCH STRUCTURE
Filed April 22, 1965   2 Sheets-Sheet 2
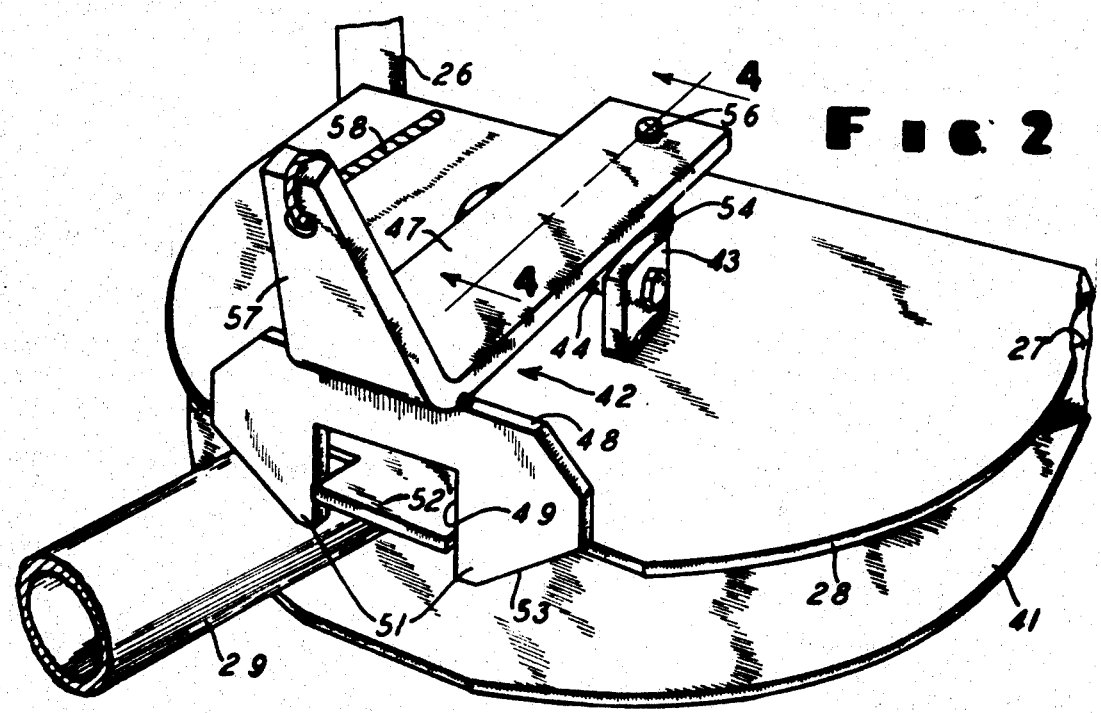
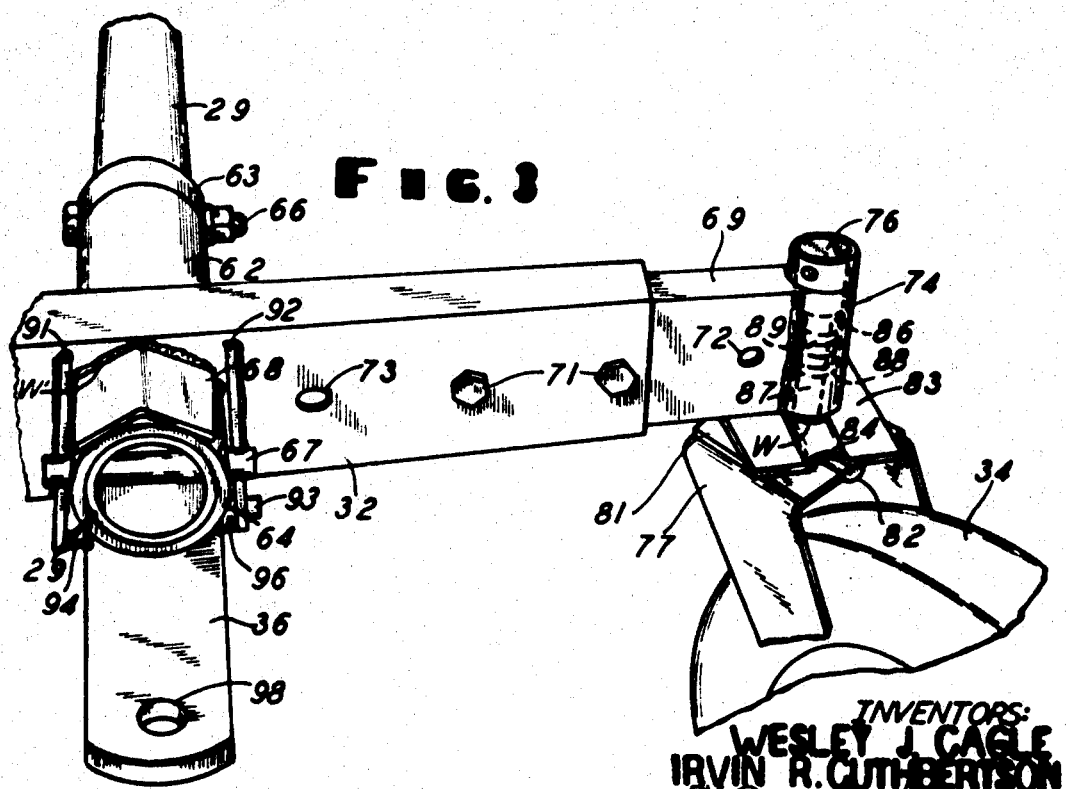
INVENTORS:
WESLEY J. CAGLE
IRVIN R. CUTHBERTSON
ATTORNEY

United States Patent Office 3,391,663
Patented July 9, 1968

3,391,663
HITCH STRUCTURE
Wesley J. Cagle and Irvin R. Cuthbertson, Pecatonica,
Ill., assignors to J. I. Case Company, Racine, Wis., a
corporation of Wisconsin
Filed Apr. 22, 1965, Ser. No. 450,026
11 Claims. (Cl. 111—52)

ABSTRACT OF THE DISCLOSURE

A hitch structure particularly connecting a tractor and a trailing implement, with the structure shown to be a dolly-type structure pivotally disposed between a cultivator, in front of the hitch structure, and a planter, trailing behind the hitch structure. Pivotal connections are provided in the hitch structure for both horizontal and vertical pivoting of sections of the hitch structure. Latch means are provided for restraining horizontal pivotal action of the hitch structure. The latch means is both automatically and manually controllable, and is automatic in response to raising and lowering of the cultivator by means of the power lift of the tractor, and also in response to pivotal action of one section of the hitch structure to another section thereof.

---

This invention relates to a minimum tillage assembly, and more particularly, it relates to a hitch structure for use between a tilling implement and a trailing planter.

It is a general object of this invention to provide a minimum tillage assembly of implements which are available to the industry and which can be hitched together for the combined functions of tilling and planting in one movement over the ground. In accomplishing this particular object, a conventional tilling mechanism and a conventional planting mechanism are employed and towed by a tractor, and the two mechanisms are rendered feasible in an assembly by means of a hitch structure disposed between and connected to the two implements.

Another object of this invention is to provide a minimum tillage assembly which provides for selective articulated connection of a tractor, a tilling implement, and a planter with these elements connected to form a train of tracking elements, and with the assembly including means, for controlling the elements in their fore-and-aft common axis. It is also significant that this particular object is accomplished in controlling lateral relation of the elements with respect to the fore-and-aft common axis in an automatic manner. That is, the elements automatically become articulated or rigid depending upon the positions of the elements and the desirability of either articulation or rigidity therebetween.

Still another object of this invention is to provide a minimum tillage assembly wherein the elements or implements thereof are efficient and easily handled in their functions, and also wherein they adapt themselves to both forward and rearward movements to be functional and controlled as desired.

Still a further object of this invention is to provide a minimum tillage assembly which can be selectively articulated or rigid with respect to the lateral direction related to the fore-and-aft common axis thereof but which also remains adjustable with respect to vertical variations such as those encountered in normal ground irregularities in tilling and planting.

Still another object of this invention is to provide a minimum tillage assembly of a train consisting of a tiller and a hitch structure and a planter and to have these elements connected so as to provide for a minimum turning radius when they are towed by a tractor. Also, the object here is to reduce the stresses in the elements when the assembly is being towed and particularly when it is making a turn.

Still a further object is to provide a minimum tillage assembly incorporating a hitch structure for connecting a towed planter thereto in a manner that the hitch structure has ground engaging wheels and is arranged so that vertical movement of the structure due to the contour of the ground is not transmitted to the planter in amplified amount but is instead held to a minimum in this vertical movement and thus a minimum of adjusting on the part of the planter is in order.

Still a further object of this invention is to provide a minimum tillage assembly wherein the tilling element, the hitch structure, and the planter can be readily either automatically or manually laterally controlled for the purpose of either planting, transport, or backing up, with each maneuver being selected as required for the particular one of the three functions mentioned.

Other objects and advantages will become apparent upon reading the following description in light of the accompanying drawings, wherein:

FIGS. 2 and 3 are enlarged perspective view of parts of the hitch structure shown in FIG. 1.

Figure 1:
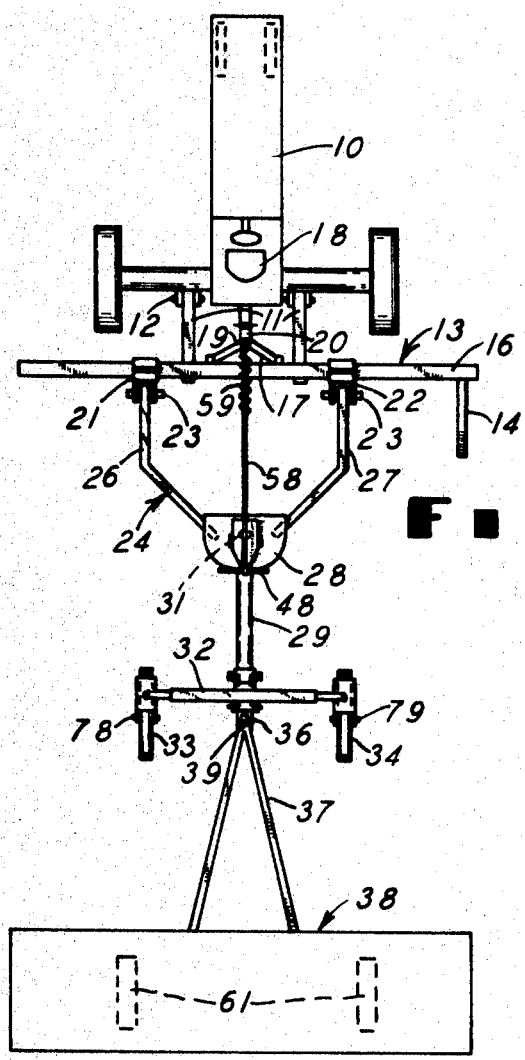
FIG. 1 is a top plan view of a minimum tillage assembly of this invention.

FIG. 1 shows a tractor 10 having conventional draft arms 11 vertically pivotally mounted thereon by means of pins or the like 12 so that the hitch arms 11 can be raised and lowered by the power of the tractor in the well-known manner. A tilting implement, indicated as a cultivator and designated 13, is attached to the hitch arms 11 to be towed by the tractor, also in the conventional manner. A cultivator tool 14 is shown on the horizontally and transversely disposed tool bar 16 of the cultivator 13, and it will be understood that a number of cultivators 14 are spaced along the bar 16 in the conventional manner. Also, the cultivator 13 has upstanding arms 17 secured to the tool bar 16 and extending thereabove in a triangular form to of course be raised and lowered with the raising and lowering of the entire cultivator 13 by means of the hitch or draft arms 11.

Of course the operator would occupy a tractor seat 18, and it will be further understood that he will be in manual control of the upper end designated 19 of the triangular support 17. That is, he will be able to reach the end 19 for a purpose described later. The connection of the cultivator to the tractor 10 is thus a conventional three-point hitch with the third link 20, as disclosed in U.S. Patent No. 2,865,657.

Conventional tool bar clamps 21 and 22 are attached to the tool bar 16 and have the usual horizontal pivot pins 23 extending therethrough. A hitch structure generally designated 24 is thus attached to the pins 23 to be vertically pivotal with respect to the cultivator 13 as the forwardly extending arms 26 and 27 of the hitch structure 24 are pivotally connected to the pivot pins 23.

The arms 26 and 27 connect to a plate 28, by means of welding or the like, and a draft tube 29 is pivotally attached to the plate 28 by means of a vertically disposed pivot pin 31 connected to the plate 28. The hitch structure 24 also includes a transversely extending frame 32 which connects to ground engaging wheels 33 and 34. A tow bar 36 is vertically pivotally attached to the frame 32 and extends rearwardly thereof and pivotally connects to a tongue 37 of a planter diagrammatically shown and generally designated 38. The planter may be of the type shown in U.S. Patent No. 3,060,873. A vertically disposed pivot pin 39 is employed between the bar 36 and the tongue 37 so that the planter 38 is also laterally pivotally connected to the hitch structure 24.

Thus a minimum tillage assembly of a tractor 10, a cultivator 13, a hitch structure 24, and a planter 38, is provided along a common fore-and-aft axis shown in FIG. 1 in the alignment of the several elements.

FIG. 2 shows the plate 28 has the arms 26 and 27 connected thereto, and another plate 41 is disposed below the assembly. Also, the draft tube 29 is shown in a slightly pivoted position with respect to its position in FIG. 1 where it is not pivoted, and this depicts that the tube 29 does pivot about the vertical pivot 31.

Figure 4:
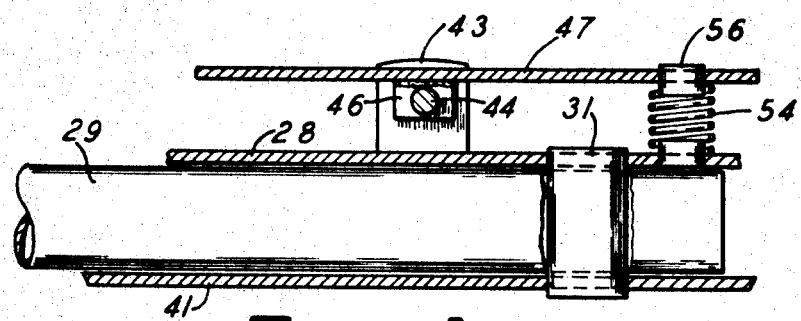
FIG. 4 is a sectional view taken on the line 4—4 of FIG. 2.

FIG. 4 shows the tube 29 extending between the plates 28 and 41 to the pivot pin 31.

FIGS. 2 and 4 also show that a latch type of lock mechanism generally designated 42, is mounted on the plate 28 by means of upstanding ears 43 and a horizontal pivot shaft 44 connected to the ears 43. Other plates or ears 46 are attached to a control arm 47 and are pivotally mounted on the shaft 44 so that the arm 47 pivots with respect to the plate 28. The arm 47 has a plate 48 attached thereto to move up and down with the pivot of the arm 47, and the plate 48 has a cut-out 49 which provides for two legs 51 for straddling the tube 29 when the latter is in the FIG. 1 position, that is, when it is alligned with the plate opening 49. It will therefore be apparent that when the plate 48 is in its downward position, the legs 51 straddle the aligned tube 29 and restrain it from pivoting laterally, and thus the hitch structure is in the rigid position.

An extension 52 is included on the plate 28, and the legs 51 also straddle the extension 52 and are thus guided by the plate 28 through its extension 52 and are given lateral support by the extension 52 to rigidly and firmly secure the tube 29.

Also, the plate 48 has lower angled surfaces 53 which act as camming surfaces when the tube 29 is outside of the opening 49 and is being pivoted into the opening 49, and the plate 48 will thus be cammed upwardly as the tube 29 pivots into an aligned and central position with respect to the plate 48. This is of course an automatic arrangement for rendering the entire hitch structure 24 rigid when it is maneuvered from the pivotal position to the aligned position with the opening 49.

FIG. 4 also shows that the arm 47 is urged in a direction to have the plate 48 urged downwardly, and this is accomplished by a compression spring 54 extending between the plate 28 and the guide pin 56 on the rear end of the arm 47. The upper end of the arm 47 has a flexible cable or rope 58 attached thereto, and the rope extends to a tension spring 59 which in turn is hooked onto the upper end 19 of the upright structure 17 on the cultivator. Since the connection between the spring 59 and the upper end 19 is of a conventional hook nature, it will be understood that the operator can simply unhook the spring 59 from the upright 17 and thus release control of the latch 42. The operator will desire to do this unhooking when he wants to move the entire assembly backwards but retain the hitch structure 24 in the rigid position, that is with the arm 47 lowered so that the plate 48 will secure the tube 29. Of course in backing the assembly, the cultivator 13 would be raised, and this would also raise the upright 17 to pull on the spring 59 and the rope 58 and thereby raise the plate 48 through the pivot of the arm 47. The raising of the plate 48 would release the tube 29, and this the operator does not want to do in backing up, so he simply unhooks the spring 59 as described.

Also, the converse of this maneuver is prevalent when the operator raises the cultivator 13 by means of the hitch arms 11 and causes the spring 59 and the rope 58 to release the latch 42 by raising same. This is desired when the assembly is to be placed in the transport position so that the assembly is articulated and the tube 29 can thus pivot as desired and the units will track in their forward towing by the tractor 10. Of course the tension in the spring 59 is adequate upon a certain raising of the cultivator 13 to overcome the force exerted by the spring 54, which is urging the latch 42 in the lock position.

It is also important to understand that the inclusion of the spring 59 permits the entire assembly to adust to irregularities in the ground contour in that the hitch structure 24 is vertically pivotal with respect to the cultivator 13 by means of the hitch pins 23, but certain vertical pivoting will not result in a pull on the spring 59 and the rope 58 to cause the latch 42 to be released upwardly. That is, the latch 42 is in its locked position during the tilling and planting maneuvers and it will remain so even though the ground contour may be irregular and cause the cultivator and hitch structure to pivot in the vertical plane with respect to each other. Of course the operaor can also manually pull the spring 59 to release the latch 42 at any time he may so desire, so a fourth way of controlling the latch is possible.

FIG. 1 shows that the hitch structure 24 is supported by its ground wheels 33 and 34, and also the planter 38 has ground wheels 61. FIG. 3 shows the tube 29 extending beyond the frame 32, and a sleeve 62 extends over the tube 29 and through the frame 32. Stop collars 63 and 64 are pinned to the tube 29 by means of a bolt 66 and a pin 67, as shown. Thus the tube 29 is fixed axially with respect to the frame 32, but the tube can and does connect to the frame 32 to permit the latter to rotate slightly about the axis of the tube 29. The limit of frame rotation is determined by a stop plate 68 affixed to the frame 32 as shown. The ends of the pin 67 thus abut the edges of the plate 68 when the frame 32 has pivoted or rotated to its limit by means of the wheels 33 and 34 cooperatively raising and lowering according to the contour of the ground on which they are riding. This therefore permits the hitch structure 24 to adapt itself to the ground contour without straining the structure and without interfering with the operation of the structure or the elements attached to it at either end.

The frame 32 is also shown to include an extension 69 which is adjustably secured to the frame 32 by means of bolts 71 which pass through holes 72 in the extension and holes 73 in the frame 32, all as elected. The extension 69 carries an upright sleeve or socket 74 which rotatably supports a shaft 76. The lower end of the shaft 76 is attached to a wheel yoke 77 which in turn each rotatably supports the wheels 33 and 34 by means of the axles 78 and 79 as shown in FIG. 1.

The yoke 77 includes a plate 81 which has an enlargement 82 extending along the length of the plate 81. A mating plate 83 is rigidly connected to the extension 69 by means of welding W, and the plate 83 has a notch 84 which nests with and receives the enlargement 82 when the wheel 34 is in the fore-and-aft direction of the assembly. This arrangement thus urges the wheel 34 to remain in the fore-and-aft direction although the wheel is actually a castering wheel as shown, and of course the wheel 33 is identical to the wheel 34 in the structure described with respect to its mounting, castering, and all the rest.

FIG. 3 also indicates that the shaft 76 has a shoulder 86, and the lower end 87 of the shaft 76 is reduced in diameter. The sleeve 74 has a shoulder 88, and the shoulders 86 and 88 face each other, and a compression spring 89 is thus disposed between the two shoulders to urge the shaft 76 upwardly and thus urge the plate 81, to which the shaft is connected, also upwardly. This therefore retains the wheels 33 and 34 in the fore-and-aft direction until substantial force is encountered to cause the wheels to caster. Thus the wheels will normally be held in the fore-and-aft direction in operation and this will also be useful in backing the assembly.

FIG. 1 also shows the axles 78 and 79 are aligned with the hitch pin 39, and thus the up and down movement of the wheels 33 and 34 according to ground irregularities does not amplify the up and down movement of the hitch pin 39. This therefore does not hinder the operation of the planter 38, and thus the location of the hitch pin 39 on the vertical plane of the axles 78 and 79 is useful and important.

Figure 5:
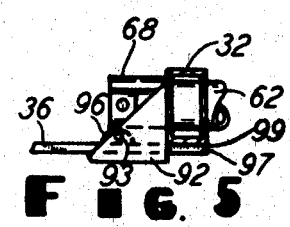
FIG. 5 is an enlarged side view of a fragment of FIG. 1.

FIGS. 3 and 5 show the tongue 36 connected to the hitch frame 32 through fixed plates 91 and 92 and a pin 93. The latter passes through plates 94 and 96, which in turn is connected to the tongue 36 by welding or the like. The pin 93 is pivotal in the plates 91 and 92, but the tongue end 97 abuts the frame 32 to limit the pivot of the tongue 36 downwardly at its hitch opening 98. The pivot of the tongue 36 is thus in one direction only because of the stop 99 provided by the frame 32. The tongue supports the front end of the planter, but damage to the hitch is prevented when the cultivator is lifted, or when the assembly is on irregular terrain.

There is therefore provided the hitch structure 24 with its latch 42 which provides for alternate articulated and rigid connections between the cultivator and the planter. The tension spring 59 provides for variations in the relationships between the latch parts, the length of the cable 58, and the location of the upright structure 17 in its height and the like. This inherent accommodation feature of the spring 59 is in addition to the function that it has of accommodating the ground irregularities so as not to release the latch 42 when it is desired to have the latch remain locked, though the assembly is moving over bumpy or hilly terrain.

Accordingly, there is provided a minimum tillage assembly which includes a conventional cultivator 13 and a conventional planter 38. The intervening hitch structure 24 makes it possible to complete the assembly without modification of the conventional implements. Thus the operator can maneuver the assembly over the ground in only one pass to do both the cultivating and the planting, all in the one operation. The hitch structure 24 is sufficiently long to provide for the turning of the assembly as desired.

While a specific embodiment is shown, the invention should be determined by the scope of the appended claims.

What is claimed is:

1. A minimum tillage assembly with a tractor, comprising a ground working implement connected to said tractor to be towed thereby, a seed planter of the draft type and including towing connection means of the lateral pivot type, a hitch structure being elongated and disposed rearwardly of said implement and intermediate and connected to both said implement and said planter and being both vertically and laterally pivotal with respect to said implement and being connected to said planter at said towing connection means to provide an articulated tracking train of said tractor and said implement and said hitch structure and said planter, said hitch structure including a frame and ground engaging wheels for vertically supporting said towing connection means, said wheels being vertically movably mounted with respect to each other and with respect to said towing connection means when the latter is connected to said hitch structure, said hitch structure including a horizontally pivotal connection for the lateral pivotal relation with respect to said implement and including means for restraining said horizontally pivotal connection to selectively provide a laterally rigid connection between said implement and said hitch structure from said implement to the location of said towing connection means on said planter, said hitch structure frame and wheels being disposed rearwardly of said horizontally pivotal connection with respect to the forward direction of draft of said assembly.

2. A minimum tillage assembly with a tractor, comprising a ground working implement connected to said tractor to be towed thereby, a seed planter of the draft type and including towing connection means of the lateral pivot type, a hitch structure being elongated and disposed rearwardly of said implement and intermediate and connected to both said implement and said planter and being both vertically and laterally pivotal with respect to said implement and being connected to said planter at said towing connection means to provide an articulated tracking train of said tractor and said implement and said hitch structure and said planter, said hitch structure including a frame rotatable therein about the fore-and-aft axis of the draft of said assembly, ground engaging wheels on said frame for vertically supporting said towing connection means, the location of the axes of said wheels and said towing connection means being on the same vertical plane for minimum vertical displacement of said hitch connection means when said wheels encounter an elevation change on the ground, said hitch structure including a horizontally pivotal connection for the lateral pivotal relation with respect to said implement and including means for restraining said horizontally pivotal connection to selectively provide a laterally rigid connection between said implement and said hitch structure from said implement to the location of said towing connection means on said planter.

3. A minimum tillage assembly with a tractor of the lifting hitch type, comprising a ground working implement having an upright member and being connected to said tractor hitch to be towed and lifted thereby, a seed planter of the draft type, a hitch structure being elongated and disposed rearwardly of said implement intermediate and connected to both said implement and said planter and being laterally pivotal with respect to said both to provide an articulated tracking train of said tractor and said implement and said hitch structure and said planter, said hitch structure including ground engaging wheels and having a horizontally pivotal connection to said implement and including movable locking means for restraining said horizontally pivotal connection to selectively provide a laterally rigid connection between said implement and said hitch structure, flexible control means limitedly extendable and being connected between said locking means and said upright member on said implement for pulling on said locking means in response to lifting of said implement by said tractor and with respect to said hitch structure to actuate and thereby unlock said locking means.

4. A minimum tillage assembly with a tractor of the lifting hitch type, comprising a ground working implement having an upright member and being connected to said tractor hitch to be towed and lifted thereby, a seed planter of the draft type, a hitch structure being elongated and disposed rearwardly of said implement intermediate and connected to both said implement and said planter and being laterally pivotal with respect to said both to provide an articulated tracking train of said tractor and said implement and said hitch structure and said planter and being vertically pivotally connected to said implement, said hitch structure including ground engaging wheels and a horizontally pivotal connection for the lateral pivotal relation with respect to said implement and including movable locking means for restraining said horizontally pivotal connection to selectively provide a laterally rigid connection between said implement and said hitch structure, spring means for yieldingly urging said locking means into one direction and into a locked position, control means including a tension spring limitedly extendable and being connected between said locking means and said upright member on said implement and being adapted to extend to a limit and pull on said locking means in the direction opposite said one direction and against said spring means in response to lifting of said implement by said tractor in the direction away from said locking means to actuate and thereby unlock said locking means, and said control means extending between said implement and said hitch structure to provide for limited vertical pivot of the latter without actuation of said locking means.

5. A minimum tillage assembly with a tractor having a lift-type hitch, comprising a ground working implement connected to said tractor to be towed and lifted thereby and including an upright member, a seed planter of the draft type, a two-section hitch structure being laterally pivotal between the two sections thereof and with respect to the fore-and-aft axis of said tractor and being disposed intermediate and connected at respective ones of said sections to said implement and said planter to provide an articulated tracking train of said tractor and said implement and said hitch structure and said planter, said hitch structure and said implement being vertically pivotally connected together, releasable latch means on said hitch structure and adapted to be released by pulling thereon and said latch means adapted to extend between said sections to selectively restrain said sections from lateral pivotal movement to provide a laterally rigid connection between said implement and said hitch structure and from said implement to said planter, and a control means including a limitedly yieldingly elongation means and being connected between said upright member and said latch means to pull on said control means for releasing said latch means upon lifting of said implement beyond a limited height.

6. A tillage assembly with a tractor having a lift-type hitch, comprising a ground working implement connected to said tractor to be towed and lifted thereby (and including an upright member), a seed planter of the draft type, a two-section hitch structure being laterally pivotal between the two sections thereof and with respect to the fore-and-aft axis of said tractor and being disposed intermediate and connected at respective ones of said sections to said implement and said planter to provide an articulated tracking train of said tractor and said implement and said hitch structure and said planter, said hitch structure including ground wheels and being vertically pivotally connected to both said implement and said planter with the pivotal connection to the latter being limited in one direction by means of a stop to support said planter, and releasable latch means on said hitch structure and extending between said sections thereof to selectively restrain said sections from lateral pivotal movement to provide a laterally rigid connection between said implement and said hitch structure from said implement to said planter.

7. A tillage assembly with a tractor, comprising a tilling implement connected to said tractor and towed thereby, a seed planter of the draft type and including towing connection means of the lateral pivotal type, hitch means bein elongated and disposed rearwardly of said implement intermediate and connected to both said implement and said planter and being laterally pivotal with respect to said implement and including a vertically pivotal rearwardly extending tongue connected to said planter at said towing connection means to provide both a vertically pivotal connection and an articulated tracking train of said tractor and said implement and said hitch means and said planter, a stop on said hitch means engageable with said tongue to limit downward movement of the rear end of said tongue for support of said planter towing connection means, said hitch means including ground engaging wheels for vertically supporting said towing connection means, said hitch means including a horizontally pivotal connection for the lateral pivotal relation with respect to said implement and including means for restraining said horizontally pivotal connection to selectively provide a laterally rigid connection between said implement and said hitch means from said implement to the location of said towing connection means on said planter.

8. A minimum tillage assembly with a tractor, comprising a ground working implement connected to said tractor to be towed thereby, a seed planter of the draft type, hitch means disposed intermediate and connected to said implement and said planter and being pivotal laterally to the fore-and-aft axis of said tractor to provide an articulated tracking train of said tractor and said implement and said hitch means and said planter, said hitch means including a frame extending transverse to said fore-and-aft axis and being pivotal about said fore-and-aft axis, ground engaging wheels, rotational connecting means mounting said frame to the remainder of said hitch means for rotation of said frame about said fore-and-aft axis for having said ground wheels rise and fall according to changes in ground contour, means on said frame for laterally adjustably mounting said ground engaging wheels on the transverse ends of said frame, said hitch means including a horizontally pivotal connection for the lateral pivotal relation with respect to said implement and including means for restraining said horizontally pivotal connection to provide a laterally rigid connection between said implement and said hitch means and from said implement to said planter.

9. An implement hitch structure comprising two sections disposed in tandem and being relatively vertically and laterally pivotal with respect to the fore-and-aft axis extending through said sections, said sections also being relatively rotatable between at least portions thereof and about said axis and with the opposite fore-and-aft ends of said structure being adapted to respectively connect to implements for both said relative vertical and lateral pivotal movement and for limited rotational movement between said implements and about said axis, and releasable latch means on said hitch structure and extending between said sections thereof to selectively restrain said sections from lateral pivotal movement to provide a laterally rigid connection therebetween.

10. An implement hitch structure comprising two sections disposed in tandem and being relatively vertically and laterally pivotal with respect to the fore-and-aft axis extending through said sections, said structure also having portions relatively rotatable about said axis, means on the opposite fore-and-aft ends of said structure to respectively connect to implements for both said relative vertical and lateral pivotal movement and for limited rotational movement between said implements and about said axis, one of said sections having ground wheels for supporting said hitch structure, and releasable latch means on said hitch structure and extending between said sections thereof to selectively restrain said sections from said lateral pivotal movement to provide a laterally rigid connection therebetween.

11. An implement hitch structure comprising a plurality of sections disposed in a line and having an axis extending therethrough along said line and being relatively vertically and laterally pivotal with respect to said axis, said sections including portions which are relatively rotatable about said axis and with said sections being adapted to exclusively operatively connect with implements for both said relative vertical and lateral pivotal movement and for said rotational movement between said implements, one of said sections having ground wheels for supporting said hitch structure, releasable latch means on said hitch structure and extending between two of said sections thereof to selectively restrain said two sections from said lateral pivotal movement to provide a laterally rigid connection therebetween, and remote control means connected to said latch means for releasing the latter, and said latch means being adapted to automatically become latched upon said lateral pivotal movement of said two sections into alignment on said axis.

References Cited

UNITED STATES PATENTS

| | | | |
|---|---|---|---|
| 1,106,028 | 8/1914 | Coleman | 172—507 X |
| 2,062,282 | 12/1936 | Acton | 172—677 X |
| 2,678,222 | 5/1954 | Payzant | 280—474 |
| 2,719,369 | 10/1955 | Lindbeck | 280—474 X |
| 3,194,322 | 7/1965 | Hansen | 172—677 X |

FOREIGN PATENTS

| | | |
|---|---|---|
| 147,181 | 7/1952 | Australia. |
| 244,160 | 3/1963 | Australia. |
| 426,440 | 4/1935 | Great Britain. |

ABRAHAM G. STONE, *Primary Examiner.*

A. E. KOPECKI, *Assistant Examiner.*